Oct. 24, 1944.     V. V. MAPPIN     2,361,304
HITCH AND SUPPORT FOR SEMIMOUNTED IMPLEMENT
Original Filed June 10, 1940     2 Sheets-Sheet 1
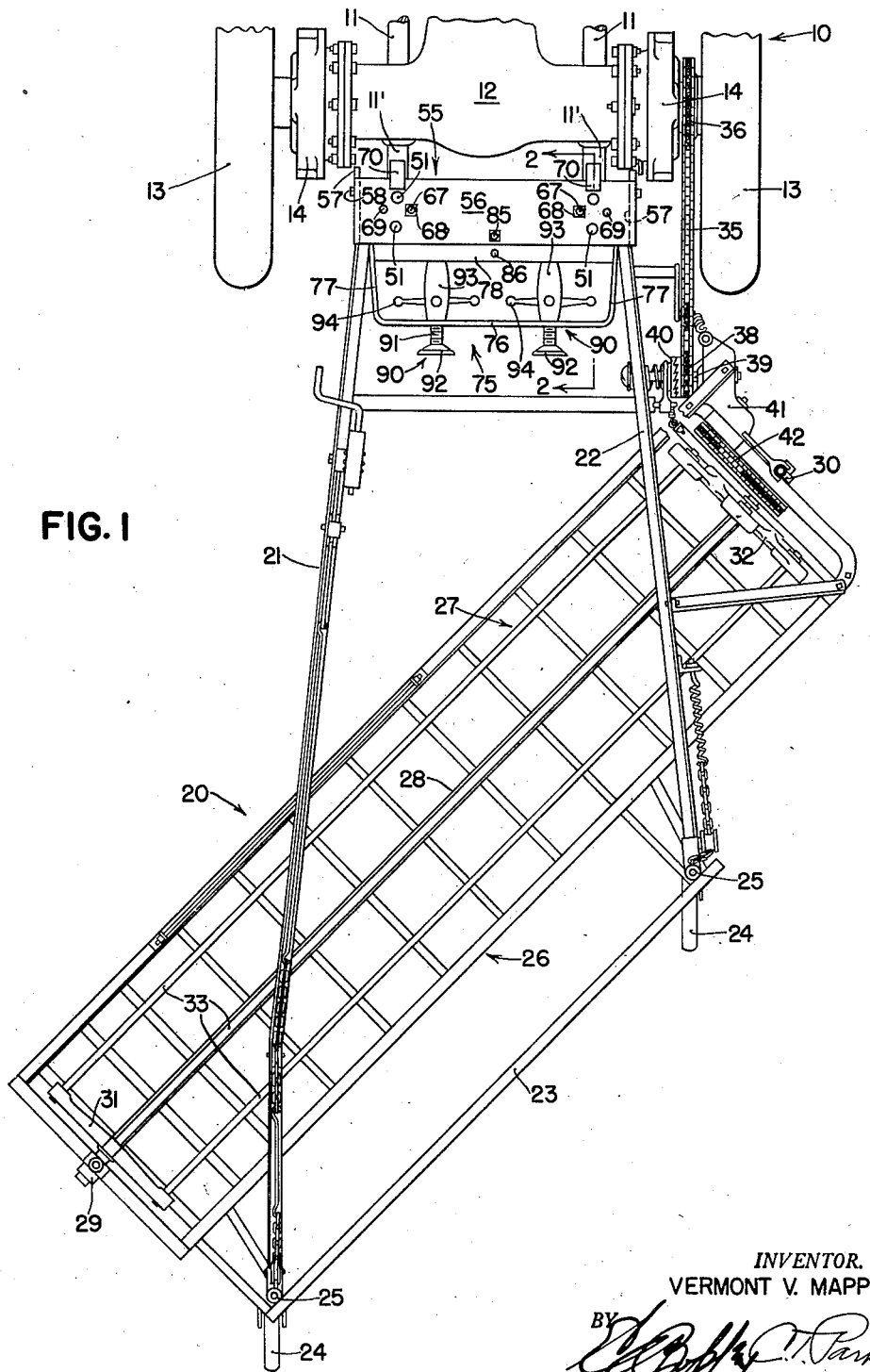
FIG. I
INVENTOR.
VERMONT V. MAPPIN
ATTORNEYS Oct. 24, 1944.  V. V. MAPPIN  2,361,304
HITCH AND SUPPORT FOR SEMIMOUNTED IMPLEMENT
Original Filed June 10, 1940   2 Sheets-Sheet 2
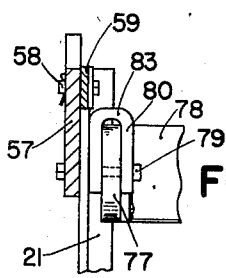
FIG. 6
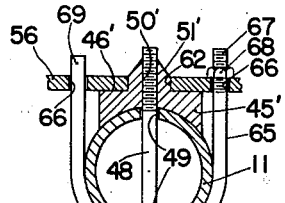
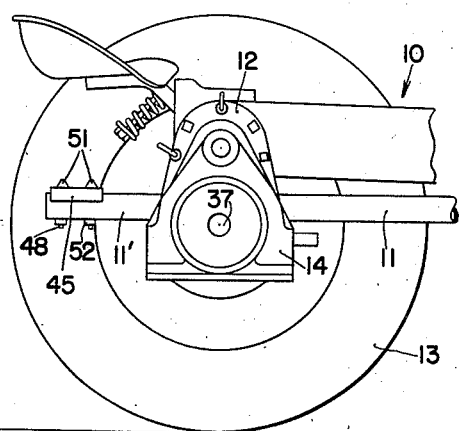
FIG. 3
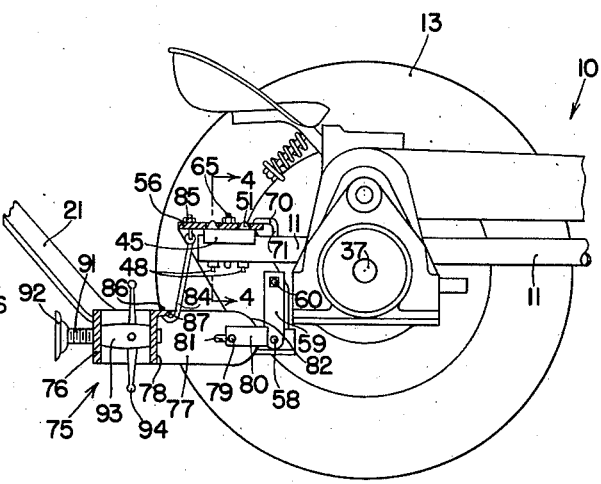
FIG. 2
FIG. 5
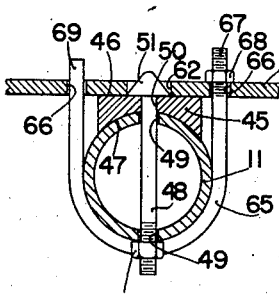
FIG. 4
INVENTOR.
VERMONT V. MAPPIN
BY
ATTORNEYS Patented Oct. 24, 1944

2,361,304

UNITED STATES PATENT OFFICE 2,361,304

HITCH AND SUPPORT FOR SEMIMOUNTED IMPLEMENTS

Vermont V. Mappin, Ottumwa, Iowa, assignor to Dain Manufacturing Company of Iowa, Ottumwa, Iowa, a corporation of Iowa Original application June 10, 1940, Serial No. 339,670. Divided and this application July 3, 1943, Serial No. 493,479

9 Claims. (Cl. 280—33.44)

The present invention relates generally to hitch devices and more particularly to a hitch device for coupling a trailer or trailing implement to a tractor and is particularly applicable to trailing implements of the type comprising a longitudinally extending frame carried at its rear end on ground engaging wheels and adapted to be supported at its forward end on the tractor.

The principal object of the present invention relates to the provision of a novel and improved coupling device for supporting the forward end of the implement as the tractor is backed into position, for lowering the implement into a normal operating position supported on the tractor, and for securing the implement in draft transmitting relation to the tractor. This application is a division of an application, Serial No. 339,670, filed June 10, 1940, by Moschel, Jones, McClellan and myself and issued December 7, 1943, as Patent No. 2,336,117. A further object relates to the provision of a novel jack stand for lowering the implement into coupled relation on the tractor, and which can be swung to a raised transport position after the implement is coupled.

These and other objects and advantages of the present invention will be apparent to those skilled in the art after a consideration of the following description of one embodiment of my invention, reference being had to the drawings appended hereto, in which Figure 1 is a plan view of a side deliverey rake coupled to the rear end of a tractor by a coupling and supporting device embodying the principles of this invention.

Figure 2 is a side elevational view showing the rear end of the tractor with one wheel removed and showing the coupling device taken in section along a line 2—2 in Figure 1, the coupling device being shown in coupled relation.

Figure 3 is a side elevational view similar to Figure 2, but with the implement detached from the tractor and supported on the stand.

Figure 4 is an elevational view taken in section along a line 4—4 in Figure 2 and drawn to an enlarged scale to show the details of construction of one of the coupling devices.

Figure 5 is a view similar to Figure 4 but showing a modification.

Figure 6 is a plan view drawn to an enlarged scale, taken in section along a line 6—6 in Figure 3.

Referring now to the drawings, the tractor is indicated generally by reference numeral 10 and comprises a frame including a pair of laterally spaced longitudinally extending frame members 11, a transversely disposed rear axle housing 12 suitably mounted on the frame members 11 and containing differential mechanism for driving a pair of drive shafts (not shown) within the axle housing 12, for driving a pair of traction wheels 13 through a suitable gear reduction disposed within depending axle housings 14 at either end of the differential housing 12. The frame members 11 extend rearwardly beyond the differential housing 12 to provide rear extensions 11' adapted for connecting implements to the tractor 10.

The implement in this embodiment is a side delivery rake, the details of which are disclosed and claimed in our above-identified application and therefore will not be described here in detail. Briefly, the side delivery rake, indicated generally by reference numeral 20, comprises an implement frame including a pair of longitudinally disposed laterally spaced frame members 21, 22 interconnected at their rear ends by means of a diagonally disposed generally horizontal frame member 23 and the frame is carried by a pair of caster wheels 24 mounted on suitable vertical spindles 25 which are swivellingly mounted on the rear ends of the frame members 21, 22. A rake frame 26 is disposed diagonally of the supporting frame beneath the upwardly arched supporting frame members 21, 22 and is carried thereon by suitable suspension members well-known to those skilled in the art. A rotary rake 27 is disposed within the rake frame 26 and includes a shaft 28 journaled in a pair of supporting bearings 29, 30, which are carried at opposite ends of the rake frame 26, respectively. At each end of the rake shaft 28 is mounted a suitable spider 31, 32, between which are supported a plurality of tooth-carrying shafts 33, the teeth of which are omitted for the sake of simplicity.

The rake rotor 27 is driven by means of a power transmitting chain 35 trained over a sprocket 36 fixed to the axle 37 of one of the wheels 13, and extends rearwardly to drive a sprocket 38 journaled on a shaft 39 rotatably mounted in suitable bearings on the rake supporting frame. The sprocket 38 drives the shaft 39 through a conventional slip clutch 40, transmitting power through a pair of intermeshing bevel gears (not shown) disposed within a housing 41 mounted on the rake frame. Power is transmitted from the bevel gears through a second chain drive 42 to drive the rake shaft 28.

Coming now to that part of the structure with which my invention is more directly concerned, the forward end of the rake supporting frame is supported on and coupled to the rear extensions 11' of the tractor frame members 11 by means which will now be described. Referring more particularly to Figure 4, each of the rearward extensions 11' is provided with a platform member 45 in the form of a block having a smooth flat upper surface 46 and a concave lower surface 47 adapted to fit the top surface of the tractor frame member 11', which is tubular in shape. The platform member 45 is secured to the tubular member by means of a pair of fore and aft spaced vertical bolts 48, extending through aligned apertures 49 in the top and bottom of the tubular members 11', and apertures 50 in the platform member 45. The bolts 48 are provided with cone-shaped heads 51 which taper upwardly, and nuts 52 engaging the threaded lower ends of the bolts 48 for securing the latter to fix the platform members 45 on the tubular members 11'. The upwardly tapering bolt heads 51 serve as pilot projections as will be later described.

In the embodiment shown in Figure 5, the cone-shaped pilot projections 51' are formed integral with the platform member 45' instead of being formed as the heads of the bolts 48', and are provided with tapped apertures 50' extending vertically substantially coaxial with the conical projections 51' and disposed in alignment with the apertures 49 in the tubular members 11'. In this embodiment the bolts 48' have conventional heads 53 disposed beneath the tubular members 11', the bolts being inserted upwardly through the apertures 49 and screwed into the tapped aperture 50' to secure the platform members 45' in place on top of the tubular members 11'.

The forward ends of the frame members 21, 22 are pivotally supported on a transversely disposed U-shaped draft member 55 comprising a transverse generally horizontally disposed plate 56 having its ends turned downwardly to provide downwardly extending supporting arms 57. The forward end of each of the members 21, 22 is pivotally mounted on a bolt 58 disposed transversely and carried between the arm 57 and a strap 59, the latter being supported from the arm 57 by a second bolt 60. The pivot bolts 58 on the two arms 57 are disposed on a common transverse axis providing for vertical swinging movement of the frame relative to the tractor. The plate 56 is provided with two pairs of fore and aft spaced holes 61, 62, arranged to receive the pilot projections either in the form of the cone-shaped bolt heads 51 or the cone-shaped projections 51' for the purpose of guiding the plate 56 down into proper position in engagement with the top surface 46 of the platform members 45. The plate 56 is secured to the platform members 45 by means of a pair of U-bolts or hangers 65 disposed transversely of the tubular members 11' and extending upwardly on opposite sides thereof, through a pair of laterally spaced holes 66 in the plate 56. One leg of each of the U-bolts 65 is threaded as indicated at 67 to receive a nut 68 which can be screwed down tightly upon the top surface of the plate 56 to secure the U-bolt in supporting position. The opposite leg 69 of each U-bolt is preferably unthreaded in order to save time in connecting the implement to the tractor, although of course this end can be threaded if desired to receive another nut 68. A pair of angular clip members 70 are rigidly fixed as by welding to the forward edge of the plate 56 in laterally spaced arrangement and having downwardly turned front ends 71 adapted to engage the top of the tubular members 11', providing an additional point of contact for greater fore and aft stability of the plate 56 relative to the platform members 45.

The implement is provided with a jack stand, indicated generally by reference numeral 75, for the purpose of supporting the forward end of the frame members 21, 22 when the implement is disconnected from the tractor and also for the purpose of lowering the plate member 56 into engagement with the conical projections 51 or 51'. The jack stand comprises a U-shaped frame including a transverse bar portion 76 and a pair of supporting legs 77, braced by means of a structural angle member 78 substantially parallel to the transverse bar portion 76 and spaced therefrom. The end of each of the supporting legs 77 is pivotally mounted by means of a bolt or pivot pin 79 between the arms of a U-shaped bracket 80, one of which is rigidly fixed, as by welding, adjacent the forward end of each of the implement frame members 21, 22. The supporting legs 77 are each provided with a slot 81 extending parallel to the legs 77, and the end of each of the latter is rounded at 82 about the outer end of the slot 81 as a center. Thus, the jack stand frame is swingable about the common transverse axis of the pivot bolts 79 and is also slidable relative thereto by virtue of the slots 81. When the implement frame is supported on the jack stand, as indicated in Figure 3, the pivot bolts 79 bear against the lower ends of the slots 81, in which case the rounded end portions 82 extend upwardly an appreciable distance beyond the U-shaped brackets 80, whereby the forward edges of the supporting legs 77 engage the crotches 83 of the U-shaped brackets 80 and prevent the jack stand from swinging fore and aft relative to the implement frame to hold the latter in supported position. However, after the implement is supported on the tractor by means of the supporting plate 56, the jack stand 75 can be lowered until the legs 77 hang on the pivot bolts 79, the latter now being disposed at the upper ends of the slots 81, whereupon the jack stand can be swung rearwardly into a horizontal transport position as indicated in Figure 2. The jack stand can be secured in this position by means of a hook 84, carried on an eyebolt 85 attached at the center of the rear edge of the plate 56 and having an upwardly turned hook portion 86 adapted to engage a suitable aperture in the flange portion 87 of the bracing member 78.

The jack stand is provided with a pair of jacks 90, each of which comprises a threaded jackshaft 91 having a ground engaging foot 92 mounted at one end thereof. The two jackshafts 91 extend upwardly through an internally threaded barrel 93, rotatably supported between the transverse bar 76 and the bracing member 78. The barrel 93 is provided with handles 94, by means of which the barrels 93 can be rotated to adjust the jackshafts 91 axially of the barrels to raise and lower the forward end of the implement frame when the latter is supported on the jack stand.

The operation of this device is as follows: The implement frame is raised by turning the handles 94 until the plate 56 is higher than the points of the tapered guiding projections 51, after which the tractor can be backed into coupling position with the projections 51 beneath the apertures 61, 62 in the plate 56. The jack handles 94 are then rotated to lower the plate 56 down upon the upper flat surfaces 46 of the platform members 45, the projections 51 acting as guides to align the implement and tractor in proper relative position. The U-bolts 65 are then inserted upwardly astraddle the tubular members 11', and the ends 67, 69 are inserted through the holes 66 in the plate 56 and the nut 68 is then attached to the threaded end 67 of each U-bolt. The handles 94 are then rotated further to lower the jack stand frame until the upper end of the slots 81 hang on the bolts 79, after which the jack stand 75 can be swung rearwardly and upwardly and secured in transport position by the hook 84. To uncouple the implement from the tractor, the jack stand is lowered and the handles 94 are rotated to raise the frame of the jack stand until the lower ends of the slots 81 pick up the pivot bolts 79. The U-bolts 65 are then removed, after which the handles 94 are again rotated to raise the plate 56 above the tapered projections 51. The tractor can then be driven away from the implement, and if desired, the platform members 45 can be removed from the tubular members 11' by first removing the bolts 48.

It will be evident to those skilled in the art that the frame members 21, 22, during operation in the field, will float up and down about the axis of the pivot bolts 58 to permit the rear end of the implement frame to roll on its own wheels 24. The implement frame is, however, rigid laterally relative to the tractor, so that when the latter makes a turn, the implement frame swings with the frame of the tractor, the castering mounting of the wheels 24 accommodating the lateral movement of the rear end of the frame.

I claim:

1. For use in an agricultural implement having a generally fore and aft extending frame and wheel means for supporting the rear end of the frame, a hitch device for mounting the front end of the frame on a propelling tractor, said hitch device comprising a generally horizontally disposed plate having a pair of spaced holes provided therein, a platform member adapted to be secured to a rearwardly extending portion of the tractor, a pair of cone-shaped projections extending upwardly from the top surface of the platform member, said projections being adapted to engage the apertures in said plate for the purpose of guiding the plate down into position on top of the platform member during the hitching operation, and means engaging said plate and adapted to pass beneath said rearwardly extending portion for securing the plate to the platform member.

2. In combination with a tractor having a pair of laterally spaced rearwardly extending frame members, an implement comprising a generally fore and aft extending frame having wheel means for supporting the rear end thereof, a hitch device for securing the front end of said frame on said tractor comprising a transversely extending, generally horizontally disposed plate adapted to overlie the rear ends of said frame members, said plate having holes provided therein normally disposed directly above said frame members, respectively, a pair of platform members mounted on top of said frame members, respectively, and having pilot projections extending upwardly from the top surfaces thereof, said projections being adapted to engage the apertures in said plate for the purpose of guiding the plate down into position on top of said platform members during the hitching operation, and securing means engaging the undersides of said frame members and extending upwardly through said plate to secure the latter to said frame members.

3. The combination set forth in claim 2, including the further provision that each of said securing members comprises a U-bolt extending under the associated frame member and projecting upwardly through said plate, and nuts detachably engaging the upper ends of said U-bolts above said plate for securing the latter to said frame members.

4. For use in an agricultural implement having a generally fore and aft extending frame and wheel means for supporting the rear end of the frame, a hitch device for mounting the front end of the frame on a propelling tractor, said hitch device comprising a generally horizontally disposed plate having an aperture formed therein, a platform member adapted to be secured to the tractor, a bolt for securing said platform member to said tractor, said bolt having a tapered head extending upwardly from the top surface of the platform member and adapted to engage said aperture in said plate to guide the plate down into position on top of the platform member, and means for securing said plate to said platform member.

5. For use in an agricultural implement having a generally fore and aft extending frame and wheel means for supporting the rear end of the frame, a hitch device for mounting the front end of the frame on a propelling tractor, said hitch device comprising a generally horizontally disposed plate having an aperture formed therein, a platform member adapted to be secured to the tractor, a bolt for securing said platform member to said tractor, said bolt having a tapered head extending upwardly from the top surface of the platform member and adapted to engage said aperture in said plate to guide the plate down into position on top of the platform member, and means for securing said plate to said platform member, said securing means comprising a generally U-shaped member beneath said platform member and extending upwardly through said plate and having means for securing said securing member to said plate.

6. In combination with a tractor having a pair of laterally spaced rearwardly extending frame members, an implement comprising a generally fore and aft extending frame having wheel means for supporting the rear end thereof, a hitch device for securing the front end of said frame on the tractor comprising a transversely extending, generally horizontal plate adapted to overlie the rear ends of said frame members, said plate having holes provided therein normally disposed directly above said frame members, respectively, a pair of bolts extending through vertically aligned holes in each of the platform members and its associated frame member, said bolts having tapered heads projecting upwardly from the top surfaces of the platform members and adapted to engage the apertures in said plate to guide the latter down into position on top of said platform members, and a U-bolt extending under each of said frame members and projecting upwardly through said plate for securing the latter to said frame members.

7. For use in an agricultural implement having a generally fore and aft extending frame and wheel means for supporting the rear end of the frame, a hitch device for mounting the front end of the frame on a propelling tractor, said hitch device comprising a generally horizontally disposed plate having an aperture formed therein, a platform member having a tapered pilot projection formed integral with said platform member and extending upwardly from the top surface thereof, said projection being adapted to engage the aperture in said plate for the purpose of guiding the latter down into position on top of said platform member, said projection having a taped aperture extending vertically and coaxially therethrough, means for securing said platform member to the tractor comprising a bolt extending upwardly through a hole in the tractor and engaging said tapped aperture, and means for securing said plate to said platform member.

8. For use with an implement comprising a generally fore and aft extending frame, wheel means for supporting the rear end of the frame, and means for attaching the front end of the frame to a draft vehicle, a frame member fixed to the forward end of the implement frame, a leg member, a pivot bolt connecting said leg member with said frame member providing for swinging movement of said leg member in a substantially vertical plane, one of said members having an elongated slot adapted to receive said pivot bolt, the weight of the frame when resting on said leg causing said pivot bolt to engage one end of said slot, and a stop on the frame engageable with said leg member when said bolt is disposed at said one end of the slot to prevent the leg from swinging relative to said frame, said leg being freely swingable when said bolt is at the other end of the slot, thereby providing for swinging said leg member to a raised transport position after the weight of the frame has been transferred from said leg member to a draft vehicle.

9. For use in an implement comprising a generally fore and aft extending frame, wheel means for supporting the rear end of the frame, and means for attaching the front end of the frame to a draft vehicle, the combination of a generally transversely disposed U-shaped stand positioned adjacent the front end of the frame, the arms of said stand having lengthwise extending slots provided therein, the ends of said arms being arcuate about the outer ends of the slots, pivot bolts on said frame disposed within the slots, said stand being swingable vertically about said pivot bolts and slidable relative thereto along the length of the slots, the weight of the frame when resting on said stand causing said pivot bolts to assume positions at one end of the slots, a stop fixed to said frame and engageable with the edge of one of said arms to prevent the stand from swinging when the frame is raising thereon, the rounded ends of said arms allowing the stand to swing freely past said stop when the pivot bolts are at the outer ends of the slots, and a jack mounted on said stand and swingable therewith.

VERMONT V. MAPPIN.